US007685988B2

(12) United States Patent
Almkvist et al.

(10) Patent No.: US 7,685,988 B2
(45) Date of Patent: Mar. 30, 2010

(54) COUPLING DEVICE FOR SPLIT IN-LINE ENGINE

(75) Inventors: Goran Almkvist, Lerum (SE); Borje Grandin, Torslanda (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/324,361

(22) Filed: Nov. 26, 2008

(65) Prior Publication Data

US 2009/0145396 A1 Jun. 11, 2009

(30) Foreign Application Priority Data

Dec. 5, 2007 (EP) ................................. 07122402

(51) Int. Cl.
*F02D 17/02* (2006.01)
*F16D 3/10* (2006.01)

(52) U.S. Cl. ...................................... 123/198 F; 464/2

(58) Field of Classification Search ............. 123/198 F, 123/DIG. 8; 701/102; 464/2
See application file for complete search history.

(56) References Cited

U.S. PATENT DOCUMENTS 4,069,803 A 1/1978 Cataldo
4,170,970 A 10/1979 McCandless
4,368,701 A * 1/1983 Huber et al. ............ 123/198 F
4,394,854 A * 7/1983 Huber .................... 123/198 F
4,417,551 A 11/1983 Kronogård et al.
4,470,379 A 9/1984 Miyakoshi et al.
4,555,003 A 11/1985 Phillips
5,092,293 A * 3/1992 Kaniut .................... 123/198 F
5,732,668 A 3/1998 Di Stefano
6,205,972 B1 3/2001 Di Stefano
7,080,622 B1 7/2006 Belloso
2004/0045287 A1 3/2004 Wylin
2004/0138026 A1 7/2004 Carriere et al.

FOREIGN PATENT DOCUMENTS

DE 3021835 12/1981
DE 3212790 10/1983
DE 3619351 10/1987
DE 202006010644 11/2006
GB 789342 1/1958
GB 1421172 1/1976
JP 58158336 9/1983

OTHER PUBLICATIONS

ISA United Kingdom, International Search Report of EP07122402, Aug. 25, 2008, 2 pages.

* cited by examiner

*Primary Examiner*—Noah Kamen
(74) *Attorney, Agent, or Firm*—Allan J. Lippa; Alleman Hall McCoy Russell & Tuttle LLP

(57) ABSTRACT

A coupling device for a split, in-line engine is provided. The coupling device may be configured to connect a first section of a crank shaft to a second section of the crank shaft of the engine. Further, the coupling device may be positioned at at least one main bearing of the crank shaft. Further still, the coupling device may be encircled by the at least one main bearing.

19 Claims, 5 Drawing Sheets

COUPLING DEVICE FOR SPLIT IN-LINE ENGINE

CROSS REFERENCE TO PRIORITY APPLICATION

This present application claims priority to European Application Number 07122402, filed Dec. 5, 2007, entitled "Coupling Device", naming Goran Almkvist and Borje Grandin as inventors, the entire contents of which are incorporated herein by reference.

TECHNICAL FIELD

The present invention relates to a coupling device for use in a split engine design.

BACKGROUND ART

The rising cost and the coming shortage of automotive fuel makes it an object for the automotive industries to improve the fuel economy of automotive vehicles. Several different improvements in the internal combustion engine technology have been made in order to maximize fuel economy. Among these improvements are different injection technologies, different ignition technologies and turbo-charging of the engine. Another improvement used to reduce fuel consumption is the development of an internal combustion engine capable of shutting down some cylinders when the full power of the engine is not needed (e.g., when cruising on a highway) and where all cylinders are used when more power is needed (e.g., when accelerating or climbing).

An engine using this type of technology is often referred to as a Variable Displacement Engine (VDE). In such an engine, the fuel supply is shut off to the cylinders that are to be shut down. At the same time, as the fuel supply is shut off, the intake valves and exhaust valves of these cylinders may be held opened or closed. With closed valves, the engine will perform an internal compression work that will induce so-called NVH (Noise, Vibration, and Harshness) problems. The magnitude of these problems is dependent on the engine speed. At high engine speeds, the NVH problems are less noticeable, so that the closed valve technology can be used at high engine speeds. At low engine speeds, the closed valve technology is impractical. One problem using open valves is that cold air is pumped into the exhaust system, which influences the three-way conversion of the catalyst in a detrimental way.

A further disadvantage with the VDE engine technology is that the pistons of the shut off cylinders still move, together with the connecting rods and the crank shaft, which in turn results in power loss due to internal friction in the engine. Yet another disadvantage with the VDE engine technology is that the torque fluctuations will increase, with a higher maximum peak torque and more zero torque passages, compared with the same engine running on all cylinders.

Different specialized modifications of multi-cylinder internal combustion engines have been disclosed earlier for achieving various results. The use of two or more separate crank shafts to serve some cylinders relative to the remaining cylinders has been described in U.S. Pat. Nos. 4,170,970, 4,470,379, 5,732,668 and 6,205,972. However, said separate crank shafts generally operate synchronously, and not in a selectively alternating manner to accomplish results other than fuel economy. U.S. Pat. No. 7,080,622 discloses a split engine, wherein the divided crank shaft is provided with an overrun clutch arranged between adjacent bearings. U.S. Pat.

No. 4,069,803 discloses a split engine with a crank shaft clutch arrangement located between adjacent bearings. The clutch comprises a hydraulically actuated cone clutch with synchronizing teeth.

These solutions may function for some applications, but they still show some disadvantages. One disadvantage is that additional space between adjacent cylinders is required. Thus, there is room for improvement.

DISCLOSURE OF INVENTION

An object of the invention is to provide a coupling device for a split, in-line engine that is compact in size.

The problem of providing a coupling device for the connection of a divided crank shaft in a split, in-line engine without increasing the overall length of the engine is thus solved.

The solution to the problem according to the invention is described in claim 1. Claims 2 to 14 contain advantageous embodiments of the coupling device. Claim 15 contains an advantageous engine including the coupling device.

The object of the invention is achieved with a coupling device for a split, in-line engine, the coupling device being configured to connect a first section of a crank shaft to a second section of the crank shaft of the engine, and the coupling device positioned at at least one main bearing of the crank shaft, such that the coupling device is encircled by the at least one main bearing.

By this first embodiment of the coupling device according to the invention, a coupling device, which will replace a regular main bearing at the same position, of an engine is provided. This is advantageous in that the same engine block can be used both for regular engines having a one-piece crank shaft and for engines having a split, two-piece crank shaft. A cost-effective manufacture of a split engine is thus allowed for. The engine packing in a vehicle is also facilitated, since the split engine will have the same dimensions as a regular engine. This is especially advantageous for early developments of split engines, when both split engines and regular engines are produced at the same time in the same production facilities. In a later stage, a split engine will probably comprise two separate smaller engines.

In an advantageous development of the invention, the coupling device is adapted or configured to be used in an engine having an equal distance between the cylinders. This allows the use of the same engine block as is already in production for regular engines.

In an advantageous development of the invention, the coupling device is positioned at the central main bearing. The advantage of this is that the engine is a symmetric split engine.

In another advantageous development of the invention, the coupling device comprises a clutch. The advantage of this is that the coupling device can be engaged and disengaged in an easy way. When a clutch is used for the synchronisation of the two crank shaft sections, the rotational speed of the two sections and the relative position between the two sections does not need to be exactly the same. The clutch allows for and will compensate for a slight difference in speed and/or position before it locks the two crank shaft sections together. In one embodiment, the clutch is an overrun clutch. In another embodiment, the clutch comprises splines that will engage only when the rotational speed of the two crank shaft sections is the same.

In an advantageous further development of the invention, the clutch comprises a lock-up means. This is advantageous in that a fixed connection between the sections of the crank shaft is provided, avoiding slippage in the clutch. In one embodiment, the lock-up means is a hydraulic lock-up device.

In an advantageous further development of the invention, the second part of the engine is started by a starter motor coupled to the second section of the crank shaft. This is advantageous in that the coupling device does not need to be used to engage the second part of the engine, which is not running, to the first part of the engine, which is running, when the second part of the engine is to be started. This reduces wear of the coupling device and simplifies the coupling device.

In an advantageous further development of the invention, the first part of the engine is started by a starter motor coupled to the second section of the crank shaft, and thus to the second part of the engine. Since both the first part and the second part of the engine are standing still before the engine is running, the coupling device can easily engage the first and second section of the crank shaft without any excessive wear. The advantage of this is that only one starter motor is required, and that this starter motor can be used both for starting the first part of the engine, as well as the second part of the engine separately. The coupling device is disengaged once the engine is running if the power delivered by the first part of the engine meets the power requirements of the vehicle.

In an advantageous further development of the invention, all main bearings of the engine are of the same type. This reduces the number of parts needed for the engine.

In an advantageous further development of the invention, all main bearings of the engine have the same dimensions. This further reduces the number of parts needed for the engine.

In an advantageous further development of the invention, the clutch is adapted or configured to synchronise the first section of the crank shaft with the second section of the crank shaft in one predefined position. The advantage of this is that the loads imposed on the crank shaft system can be optimised and reduced as much as possible. The loads imposed on the crank shaft are caused by the combustion of the engine. By using one predefined synchronising position, the bending loads and thus the loads on the bearings can be the same as for an engine having a one-piece crank shaft.

In an advantageous further development of the invention, the clutch is adapted or configured to synchronise the first section of the crank shaft with the second section of the crank shaft in three predefined positions. In this way, the synchronising of the two sections of the crank shaft can be made more quickly than when the clutch is configured to synchronise the sections in one predefined position. Depending on the ignition cycle, the loads imposed on the bearings may be more unfavourable. With a proper bearing design, this can be compensated for.

In a first embodiment of an engine, the engine comprises an inventive coupling device. In this way, an engine type having one engine block but different crank shaft solutions is provided for. This allows for an efficient production process.

BRIEF DESCRIPTION OF DRAWINGS

The invention will be described in greater detail in the following, with reference to the embodiments that are shown in the attached drawings, in which.

DETAILED DESCRIPTION OF THE DRAWINGS

The embodiments of the invention with further developments described in the following are to be regarded only as examples and are in no way to limit the scope of the protection provided by the patent claims.

Figure 1:
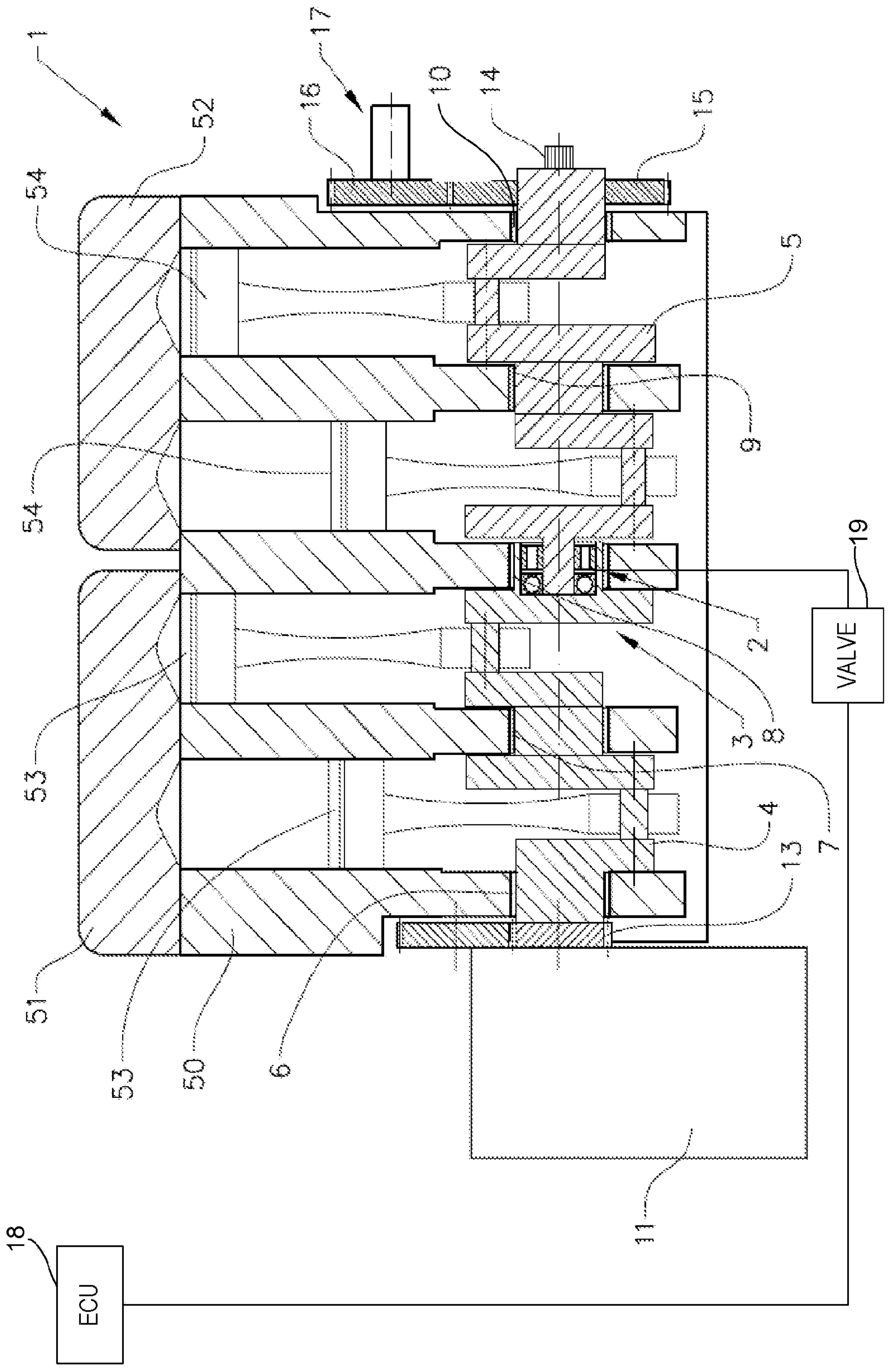
FIG. 1 shows a schematic cross-section view of an engine with a coupling device.

FIG. 1 shows a schematic engine with a coupling device according to the invention disclosed herein. The engine may be contained in a vehicle, in one example. The engine 1 comprises a crank shaft 3 which is journalled in the cylinder block 50 of the engine by main bearings 6, 7, 8, 9, 10 using oil lubricated sliding bearings. In one example, the main bearings 6, 7, 8, 9, 10 may all be the same type of bearing and/or the main bearings 6, 7, 8, 9, 10 may all have the same dimensions. The crank shaft further comprises a gear wheel 13 at the rear end of the engine that drives a first cam shaft (not shown), included in a first cylinder head 51 via a gear arrangement, and a toothed wheel 14 at the front end of the engine that drives a second cam shaft (not shown), included in a second cylinder head 52, via a driving belt. The crank shaft may further comprise an axial roller bearing for carrying thrust loads. The crank shaft is connected to a gear box 11 in a known manner.

The crank shaft 3 is divided in two sections, a first section 4 and a second section 5. The first section 4 of the crank shaft 3 is journalled by the main bearings 6, 7, 8 and the second section 5 of the crank shaft 3 is journalled by the main bearings 9, 10 and by a bearing arrangement (e.g., a coupling device) in the first section of the crank shaft. The crank shaft 3 further comprises an inventive coupling device 2 positioned between and connecting the first section 4 with the second section 5 of the crank shaft 3. The first section 4 of the crank shaft 3 drives the pistons 53 of the first cylinder bank (i.e., the first part of the engine), and the second section 5 of the crank shaft 3 drives the pistons 54 of the second cylinder bank (i.e., the second part of the engine). The first cam shaft, adapted to control the valves of the first cylinder bank, is driven by the first section 4 of the crank shaft. The second cam shaft, adapted to control the valves of the second cylinder bank, is driven by the second section 5 of the crank shaft. In this way, the valves of each cylinder bank will always be aligned with the crank shaft and thus with the pistons of the same cylinder bank. This facilitates synchronisation of the cylinder banks.

The engine in this example is an in-line four cylinder engine, but the invention is also suitable for other types of engines, such as six and eight cylinder in-line engines and V-engines, where a split engine technology is to be used. A split engine is advantageously symmetric, (i.e., the number of cylinders is divisible in equal numbers), but it is also plausible to divide a five cylinder engine, for example, into one part having three cylinders and one part having two cylinders.

The inventive coupling device 2 is positioned at the position of the main bearing 8, which may be the central bearing in one example. The coupling device is integrated in the body of the crank shaft, separating the first section 4 from the second section 5, and is encircled by the main bearing 8. By enclosing the coupling device in the crank shaft, a compact solution is provided, in which the same engine block as that used for engines with a regular crank shaft can be used. In regular engines having a regular, one-piece crank shaft, the spacing between the cylinders is substantially equal. Since the inventive coupling device is adapted to be positioned at a main bearing, so that the distance between the two cylinders next to the coupling device is the same as for the regular engine, the length dimensions of the engine block do not have to be altered. The same distance between the cylinders can thus be used for an engine comprising an inventive coupling device. This allows for a cost effective solution that uses substantially the same engine components and that can be assembled in the same assembly line as engines with a regular, one-piece crank shaft. Thus, the same engine packaging in the vehicle can be used, reducing the need for specialized components to a minimum.

The coupling device is used to control one cylinder bank of the engine. When a high power output from the engine is required, all cylinders of the engine are activated (i.e., the coupling device is activated). The activation of all cylinders may be done when around more than half of the engine power is required. When the coupling device is activated, the first section 4 and the second section 5 of the crank shaft 3 are fixedly connected to each other by the coupling device and the crank shaft functions as a regular one-piece crank shaft.

If, on the other hand, a medium to a low power output from the engine is enough to power the vehicle (e.g. when cruising on the highway or when idling in a queue), some of the cylinders of the engine are deactivated by deactivating the coupling device. The deactivation of the coupling device may be done when around less than half of the engine power is required. In this example, two of the cylinders are deactivated. Preferably, half of the cylinders of the engine are deactivated, but other numbers are plausible. The deactivation of the second cylinder bank is done by deactivating the coupling device so that the second section of the crank shaft does not rotate and thus does not power the pistons of the second cylinder bank. Since the second cam shaft is directly coupled to the second section of the crank shaft, the cam shaft will stop simultaneously. At the same time, the control system of the vehicle (e.g., the engine control unit 18) shuts off the fuel supply to the injection system of the second cylinder bank. In this way, the second cylinder bank is completely disconnected from the running part of the engine (i.e., the first cylinder bank.

The deactivation of the coupling device can be performed at any time when a low power output from the engine is enough. The advantage of deactivating a part of the engine is that the remaining part must be driven at a higher engine load to give the same output power, where the engine has higher fuel efficiency. The deactivation of the coupling device may be done when less than half of the engine power is required, but is also possible at other power levels. The activation/deactivation is preferably provided with a hysteresis having a predefined magnitude, so that the activation/deactivation is only done when required and so that an unnecessary activation/deactivation is prohibited. The selected hysteresis may be dependent on, for example, engine speed and/or the rate of the engine speed change. It is also possible to use an adaptation function for the hysteresis and for the activation/deactivation level, where the function takes account of the driving characteristics of the driver.

The activation of the second cylinder bank must be performed in a controlled way. This is done by synchronising the first section of the crank shaft with the second section of the crank shaft before the activation of the coupling device. The synchronisation of the first section with the second section is done such that the rotation speed for the second section is brought to substantially the same rotational speed as the first section of the crank shaft. When the rotational speed is substantially the same for both sections, the coupling device is activated. The coupling device comprises a lock-up device, so that when a predefined relative position between the sections is reached, the coupling device is locked in a fixed position, keeping the first and second section in a fixed relative position.

The coupling device can be controlled in various ways. In this embodiment, the coupling device is activated and deactivated by a hydraulic oil pressure. An electrically controlled valve 1 9 controlled by the engine control unit 18 of the vehicle opens and closes an oil conduit that connects the coupling device with a hydraulic pressurised source. Alternatively, the engine control unit 18 can start and stop a small hydraulic pump that applies an oil pressure to the coupling device. Thus, the coupling device may include a lock-up device which can be activated and deactivated hydraulically. The coupling device may also be electrically controlled in a direct way, by using an electromagnetic clutch in the coupling device.

The synchronising of the first section of the crank shaft with the second section of the crank shaft is done by rotating the second section. When this synchronisation is to be done, the first part of the engine, and thus the first section of the crank shaft, is rotating. The rotation of the second section of the crank shaft may be done by powering the second cylinder bank separately from the first cylinder bank. The second cylinder bank is started up by an external power source, for example a starter motor 17. In one embodiment, the starter motor is connected to the second section of the crank shaft via a first gear wheel 15 integrated with the crank shaft and a second gear wheel 16 connected to the starter motor and running on the first gear wheel. In another embodiment, the starter motor is connected to the second section of the crank shaft via a chain wheel integrated with the crank shaft. In this way, the starter motor can be used for starting the second part of the engine.

If the coupling device is used for powering the second part of the engine, great demands may be imposed on the coupling device. In order to withstand the sliding forces each time the second part is to be started, a sliding coupling device larger than a regular clutch is needed.

When the synchronisation is to be started, power is applied to the starter motor that rotates the second section of the crank shaft. At the same time, the control system of the vehicle (e.g. the engine control unit 18), starts the fuel supply to the injection system of the second cylinder bank and starts the ignition system of the second cylinder bank. The second part of the engine will thus be started separately from the first part of the engine, which is already running. When the second part of the engine is running at approximately the same speed as the first part of the engine, the coupling device is activated. The coupling device will, depending on the type, be engaged but the two corresponding parts of the clutch will slide somewhat relatively to each other until the synchronisation position is reached. When the synchronisation position is reached, the lock-up device will lock the two corresponding parts of the clutch to each other, thereby creating a stiff connection between the first and the second section of the crank shaft. The engine will then function as a regular engine having a one-piece crank shaft and is thus able to deliver full power output. A lock-up function is essential since it allows the first and second section of the crank shaft to be connected in a rigid way. This is due to the fact that the torque imposed on a crank shaft and thus on the coupling device is both positive and negative over a complete ignition cycle of the engine. Without a stiff connection of the two crank shaft sections, the engine would be noisy and would vibrate.

The rotation of the second section of the crank shaft may be measured with a sensor, positioned either at the second section of the crank shaft or at the second cam shaft. In the same way, the rotation of the first section of the crank shaft may be measured with a sensor, positioned either at the first section of the crank shaft or at the first cam shaft. The measured rotation gives information regarding the rotational speed and the position of each section of the crank shaft. The rotational speed and/or the position of the sections can be used to facilitate the synchronisation of the sections.

The synchronisation of the two sections can be performed in different relative positions, since each section uses its own cam shaft. In one embodiment, the synchronisation of the first section of the crank shaft with the second section of the crank shaft is done, via the clutch, in one predefined position. In this position, the two sections of the crank shaft are aligned in the same way as for a one-piece crank shaft. This way of synchronising the two sections is the most preferred with regards to the loads imposed on the crank shaft from the combustion.

In another embodiment, for an engine having a multiple of three cylinders, (e.g., a six-cylinder engine), three different synchronisation positions may be used. In this way, two adjacent sections are offset by either 0°, 120° or 240°. In order to achieve these positions, the lock-up device is equipped with three locking positions. This embodiment will also work well, depending on the type of bearings used in the coupling device. Thus, in another embodiment, the synchronisation of the first section of the crank shaft with the second section of the crank shaft can be done, via the clutch, in one or more of three predefined positions.

The first part of the engine or the complete engine may also be started by the starter motor coupled to the second section of the crank shaft. This is done when the engine is not running. By engaging the coupling device, the first and second sections of the crank shaft are fixedly connected and will thus function as a regular crank shaft. When the starter motor is rotated, the complete engine, including the first and second parts, will rotate and the engine can be started as a regular engine. Since both the first part and the second part of the engine are standing still before the engine is running, the coupling device can easily engage the first and second section of the crank shaft without any excessive wear. If the power requirements are great when the engine is running, the coupling device will continue to be engaged until the power requirements drop. When there is no need for both cylinder banks (e.g., both parts of the engine), the coupling device is disengaged and the second part of the engine will stop. By positioning the starter motor at the second part of the engine, only one starter motor is required for both parts of the engine.

Figure 2:
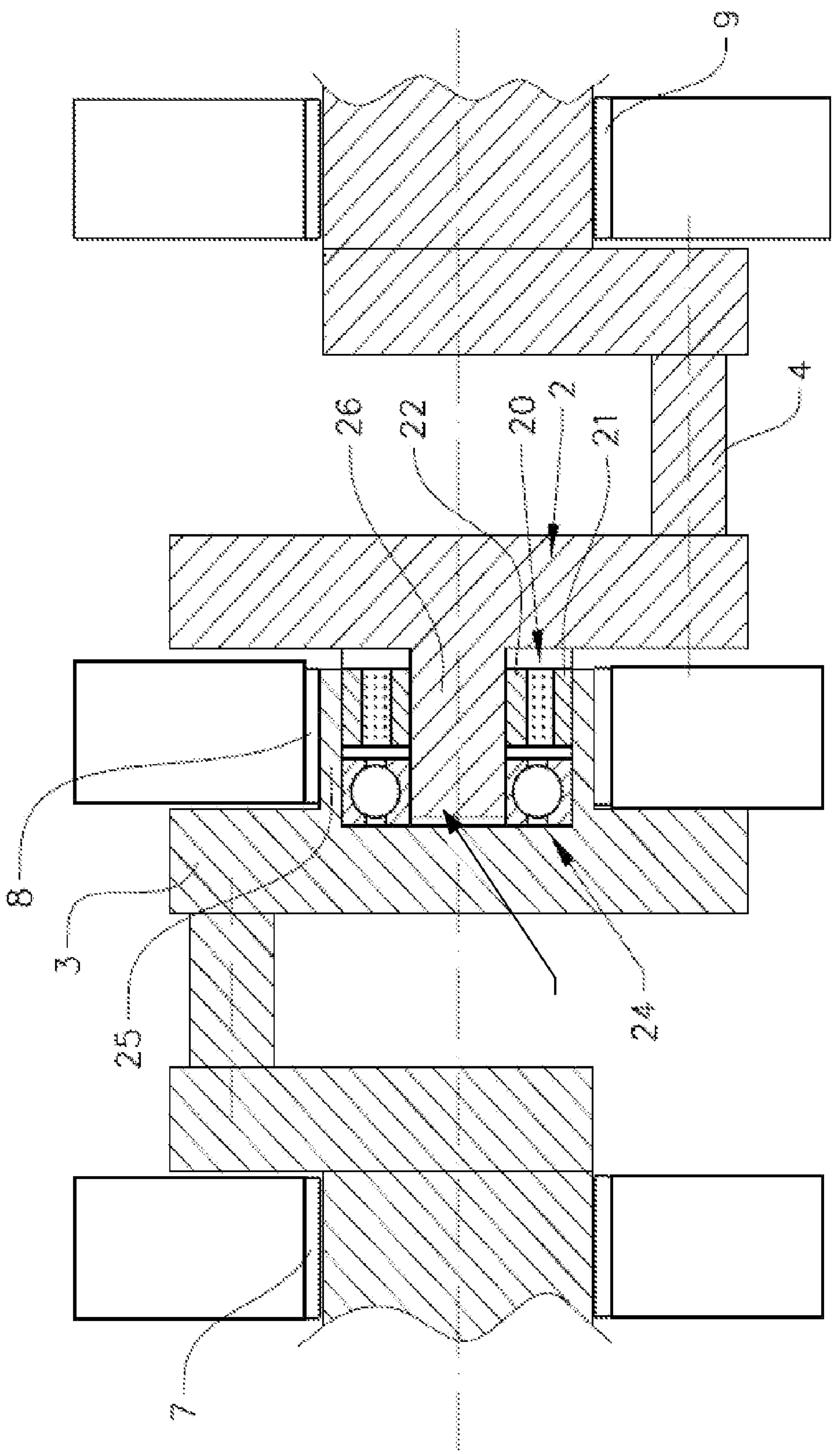
FIG. 2 shows a schematic cross-section view of an engine including a first embodiment of a coupling device.

FIG. 2 shows one embodiment of the inventive coupling device. The coupling device comprises, in this embodiment, a clutch 20 that is of the overrun type. The clutch comprises an outer ring 21 and an inner ring 22. The outer ring 21 is mounted in a circular hole 25 in the first section of the crank shaft and the inner ring 22 is mounted on a central dowel 26 of the second section of the crank shaft with the clutch 20 therebetween. The inner rings are mounted in a press-fit way, reducing play and thermal expansion problems. The clutch is controlled by a valve that will open and close the clutch depending on control signals from a control unit in the vehicle (e.g., through an oil conduit). In this embodiment, the coupling device further comprises a bearing 24, adapted to carry radial loads, since some overrun clutches do not carry any radial loads. The bearing 24 is preferably a roller bearing. The overrun clutch comprises a lock-up device that will lock the clutch in a predefined synchronised position. The overrun clutch will engage when the second section of the crank shaft rotates with the same speed as the first section of the crank shaft. The lock-up device is necessary to avoid torque fluctuations caused by the combustion of the engine. Since an engine having few cylinders, (e.g., two or three), will show negative torque during parts of a combustion cycle, the lock-up of an overrun clutch is essential to avoid the torque fluctuations from affecting the performance of the clutch.

Figure 3:
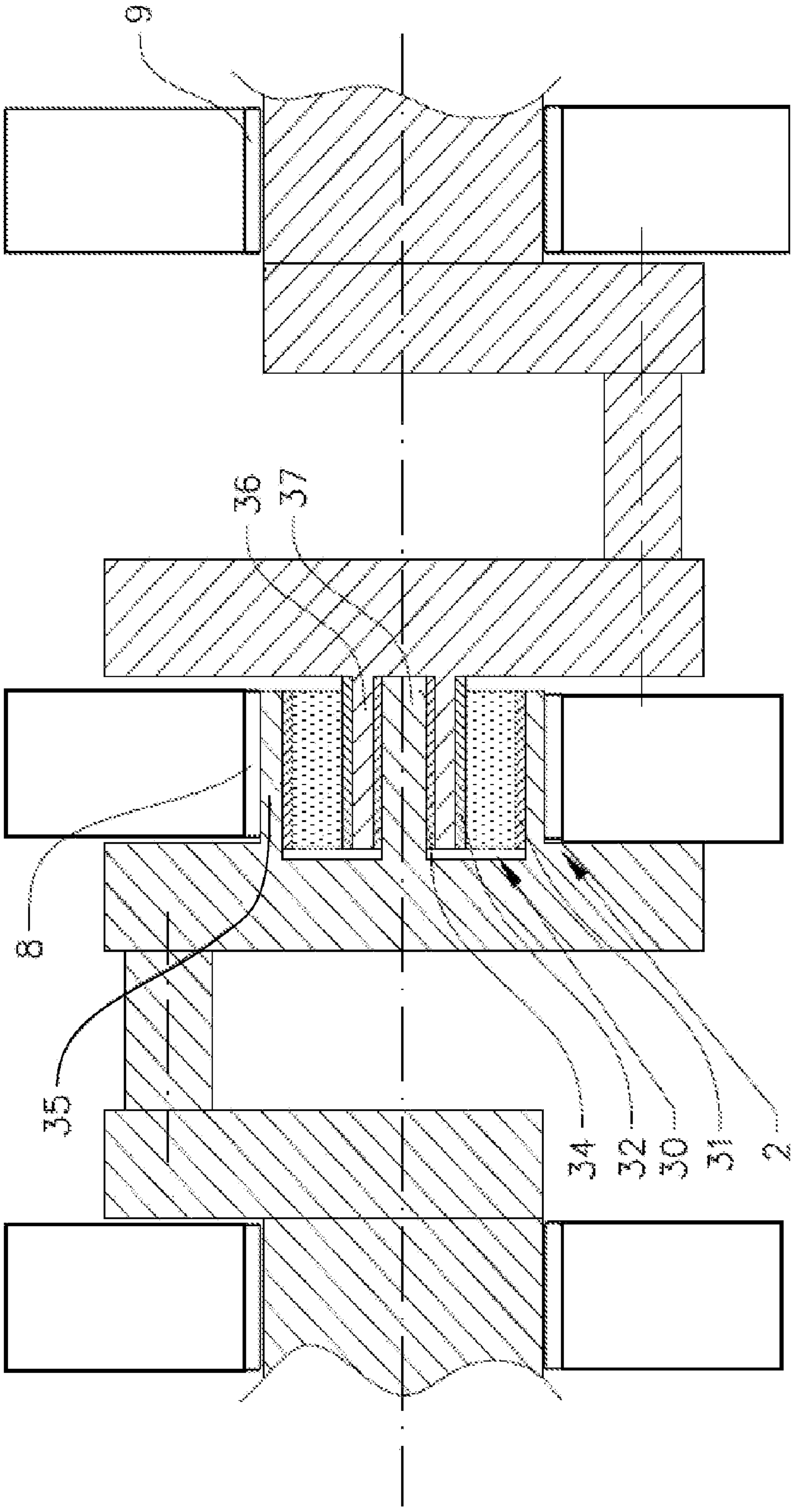
FIG. 3 shows a schematic cross-section view of an engine including a second embodiment of a coupling device.

FIG. 3 shows another embodiment of the inventive coupling device. The coupling device comprises, in this embodiment, a clutch 30 that is of the overrun type. The clutch comprises an outer ring 31 and an inner ring 32. The outer ring 31 is mounted in a circular hole 35 in the first section of the crank shaft and the inner ring 32 is mounted on an inner sleeve 36 of the second section of the crank shaft with the clutch 30 therebetween. The inner sleeve 36 is in turn mounted to a bearing 34, which is mounted on a central dowel 37 of the first section of the crank shaft. The inner rings are mounted in a press-fit way, reducing play and thermal expansion problems. The clutch is controlled by a valve (not shown) that will open and close the clutch depending on control signals from a control unit in the vehicle (e.g., through an oil conduit). In this embodiment, the bearings 8 and 34 will carry the radial loads imposed on the coupling device. The overrun clutch comprises a lock-up device that will lock the clutch in a predefined synchronised position. The overrun clutch will engage when the second section of the crank shaft rotates with the same speed as the first section of the crank shaft. The lock-up device is necessary to avoid torque fluctuations caused by the combustion of the engine. Since an engine having few cylinders (e.g., two or three), will show negative torque during parts of a combustion cycle, the lock-up of an overrun clutch is essential to avoid the torque fluctuations from affecting the performance of the clutch.

Figure 4:
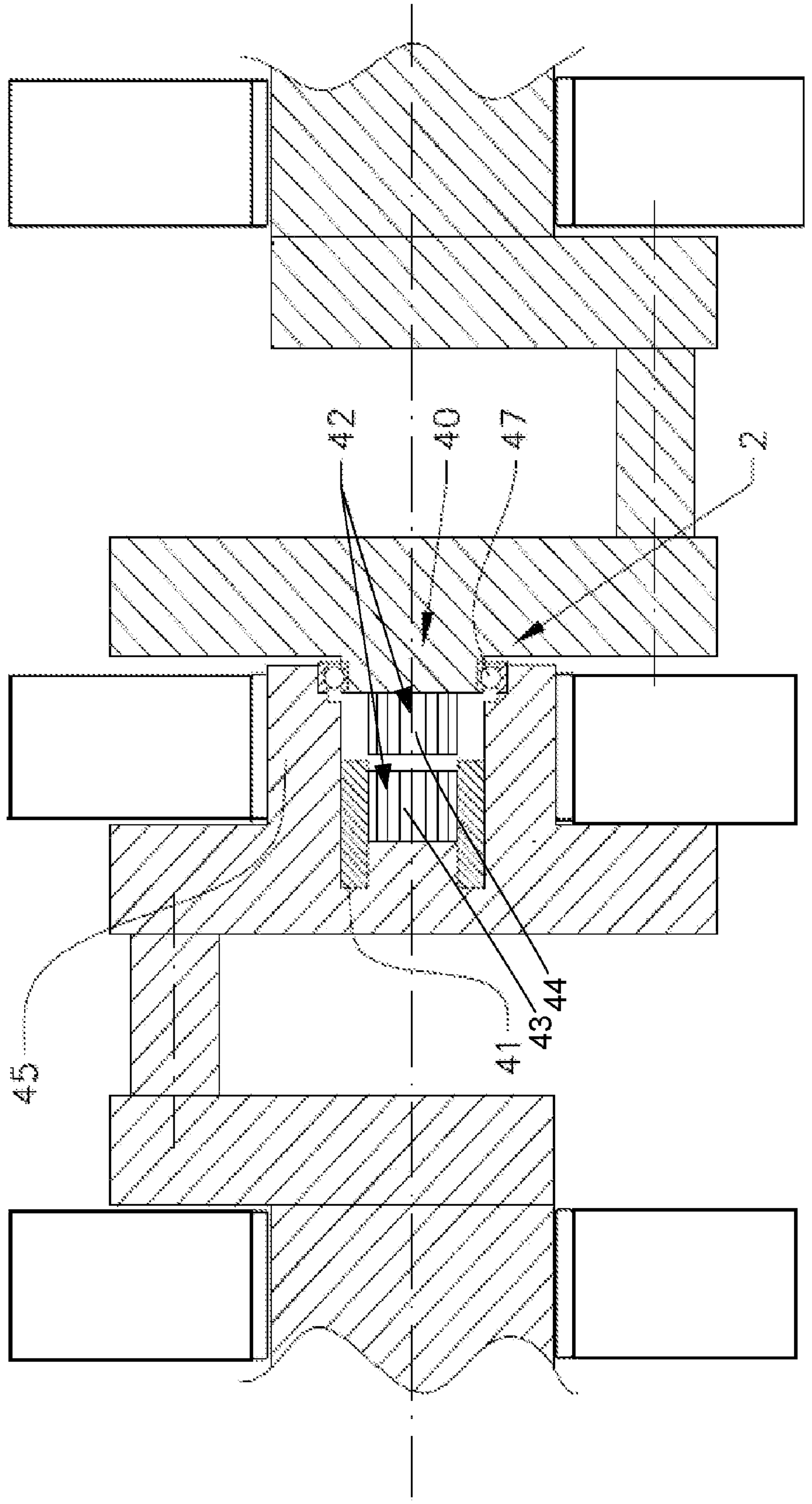
FIG. 4 shows a schematic cross-section view of an engine including a third embodiment of a coupling device.

FIG. 4 shows another embodiment of the inventive coupling device. The coupling device comprises, in this embodiment, a clutch 40 having a first circular part 43 provided with splines 42 and a second circular part 44 likewise provided with corresponding splines 42. The first circular part 43 is mounted in a circular hole 45 in the first section of the crank shaft and the second circular part 44 is mounted on the second section of the crank shaft. The clutch comprises a synchronising ring 41 that is adapted to engage the splines 42 of the first and second parts. The synchronising ring 41 is applied on the first circular part 43 of the clutch. The coupling device further comprises a bearing 47 adapted to carry radial forces imposed on the clutch.

When the second part of the engine runs with substantially the same speed as the first part of the engine, the clutch is engaged by applying an oil pressure through an oil conduit, in one example. The synchronising ring 41 is pushed towards the second part of the clutch, and when the position of the splines correspond to each other, the synchronising ring will slide onto the splines of the second part of the clutch, thereby creating a fixed connection between the first and second section of the crank shaft.

In order to ensure that the synchronising ring engages at the right synchronisation position, the positions of the first and second sections of the crank shaft can be measured with rotational position sensors, and the exact moment for the engagement of the synchronising ring can be determined by these measurements. Another way of ensuring the proper synchronisation position is to use a specific spline pattern (e.g., by providing one spline that is wider than the other splines). In this way, the synchronising ring can only slide onto the splines of the second part of the clutch in the predetermined position.

Different types of clutches to be used in the inventive coupling device have been described. It should be understood that other types of clutches can also be used.

Figure 5:
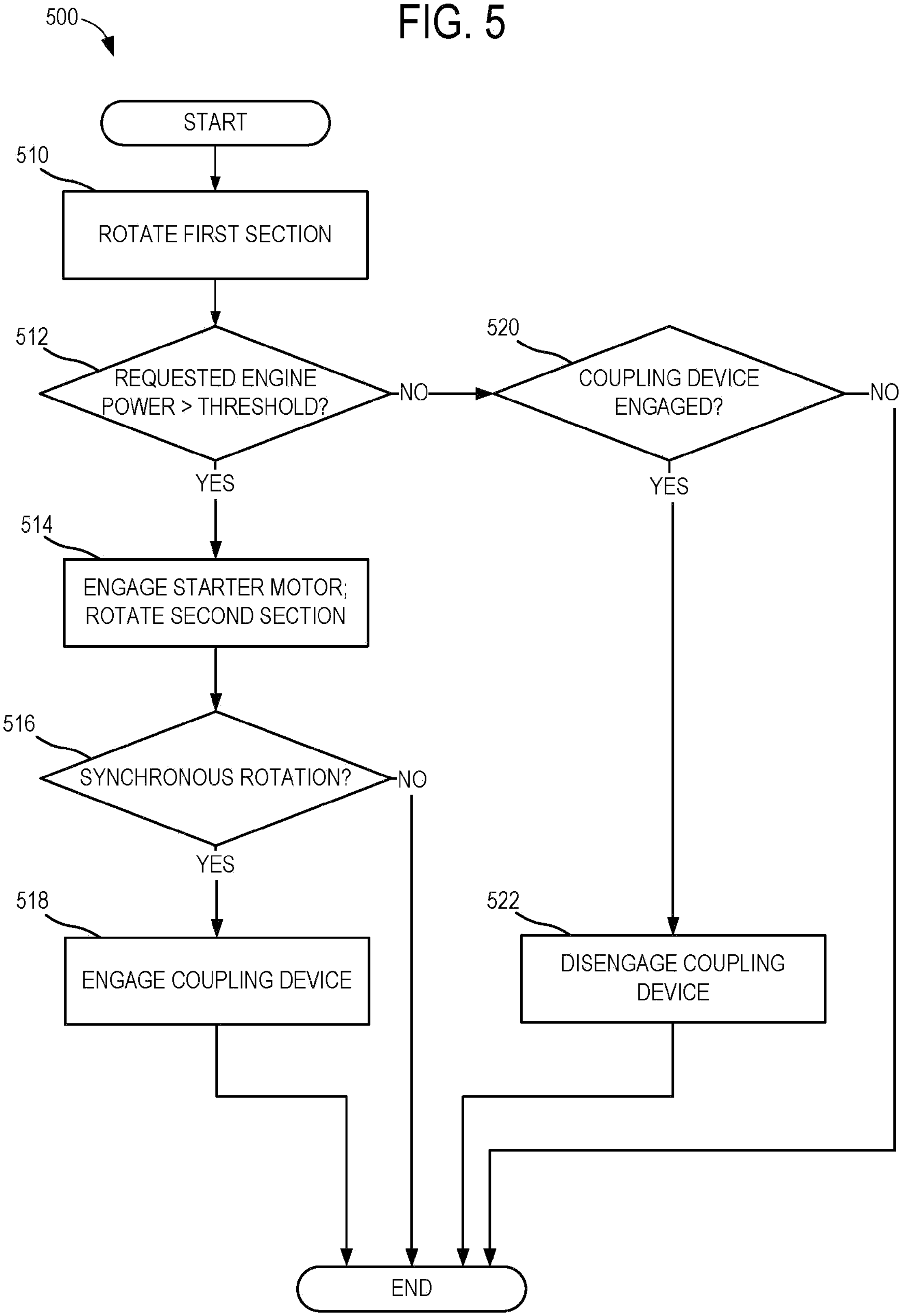
FIG. 5 shows a flowchart illustrating an example method for operating a crank shaft for a split engine.

FIG. 5 shows a flowchart illustrating an example method 500 for operating a crank shaft for a split engine, the crank shaft including a first section selectively coupable with a second section. At 510, the first section is rotated. At 512, it is determined if the requested engine power output is greater than a predetermined threshold. If the answer is yes, a starter motor, coupled to the second section of the crank shaft, may be engaged such that the second section begins to rotate and is rotated to be synchronously rotated with the first section of the crank shaft (e.g., first and second sections are rotated at the same rotation speed), while the first and second sections of the crank shaft are de-coupled at 514. If the first and second sections are synchronously rotating at 516, the coupling device may be engaged at 518. In one example, the coupling device may be engaged by engaging a lock-up device of a clutch of the coupling device such that the sections are rigidly connected to form a complete crank shaft. Alternately, if the first and second sections of the crank shaft are not synchronously rotating at 516, the routine may end.

If the answer is no at 512, (e.g., requested engine power is less than a predetermined threshold), it is determined if the coupling device is engaged at 520. If the answer is yes, the coupling device may be disengaged at 522, to stop rotation of the second section of the crank shaft. If the answer is no at 520, the routine may end.

The invention is not to be regarded as being limited to the embodiments described above, a number of additional variants and modifications being possible within the scope of the subsequent patent claims. In one example, more than one inventive coupling device can be used for an engine. For example, two coupling devices can be used to divide a 6 cylinder engine into three sections.

REFERENCE SIGNS

1: Engine
2: Coupling device
3: Crank shaft
4: First section of crank shaft
5: Second section of crank shaft
6: Main bearing
7: Main bearing
8: Main bearing
9: Main bearing
10: Main bearing
11: Gear box
13: Gear wheel
14: Toothed wheel
15: First gear wheel
16: Second gear wheel
17: Starter motor
18: Engine control unit
19: Valve
20: Clutch
21: Outer ring
22: Inner ring
24: Bearing
25: Circular hole
26: Central dowel
30: Clutch
31: Outer ring
32: Inner ring
34: Bearing
35: Circular hole
36: Sleeve
37: Central dowel
40: Clutch
41: Synchronising ring
42: Splines
43: First part of clutch
44: Second part of clutch
45: Circular hole
47: Bearing
50: Engine block
51: First cylinder head
52: Second cylinder head
53: Pistons of first cylinder bank
54: Pistons of second cylinder bank

The invention claimed is:

1. A coupling device for a split, in-line engine, configured to connect a first section of a crank shaft to a second section of the crank shaft of the engine, the coupling device positioned at at least one main bearing of the crank shaft, and the coupling device encircled by the at least one main bearing.

2. The device of claim 1, wherein the coupling device is positioned in an engine having one or more cylinders with an equal distance between adjacent cylinders.

3. The device of claim 2, wherein the at least one main bearing is a central main bearing.

4. The device of claim 1, wherein the coupling device includes a clutch.

5. The device of claim 4, wherein the clutch is an overrun clutch.

6. The device of claim 4, wherein the clutch includes splines.

7. The device of claim 4, wherein the clutch includes a lock-up device.

8. The device of claim 7, wherein the lock-up device is a hydraulic lock-up device.

9. The device of claim 4, wherein the clutch is configured to synchronize the first section of the crank shaft with the second section of the crank shaft at one predefined position.

10. The device of claim 4, wherein the clutch is configured to synchronize the first section of the crank shaft with the second section of the crank shaft at one or more of three predefined positions.

11. The device of claim 1, wherein the engine includes a first part and a second part, and wherein the second part of the engine is started by a starter motor coupled to the second section of the crank shaft.

12. The device of claim 11, wherein the first part of the engine is started by a starter motor coupled to the second section of the crank shaft when the coupling device (2) is engaged.

13. The device of claim 1, wherein a plurality of main bearings, including the at least one bearing, of the engine are the same type.

14. The device of claim 1, wherein a plurality of main bearings, including the at least one bearing of the engine have the same dimensions.

15. An in-line engine configured to drive a crank shaft, the engine comprising:

a first cylinder having a piston therein driving a first section of the crank shaft;

a second cylinder inline with the first cylinder, the second cylinder having a piston therein driving a second section of the crank shaft;

a coupling device configured to connect the first section of the crank shaft to the second section of the crank shaft of the engine, the coupling device positioned at at least one main bearing of the crank shaft, and the coupling device encircled by the at least one main bearing; and a control system configured to, under a first set of conditions, couple the first and second sections of the crank shaft to form a complete crank shaft, the first and second cylinders generating output to drive the complete crank shaft to generate engine output, and under a second set of conditions, de-couple the first and second sections of the crank shaft where the first cylinder drives the first section of the crank shaft to generate engine output.

16. The engine of claim 15 wherein during the second set of conditions, the second cylinder does not drive the second section of the crank shaft and the second section does not generate engine output.

17. The engine of claim 15, wherein the first set of conditions includes a requested engine power output above a predetermined threshold, and wherein a second set of conditions includes the requested engine power output below a predetermined threshold.

18. A method for operating a crank shaft for a split engine, the crank shaft including a first section selectively couplable with a second section via a coupling device, the method comprising:

selectively rotating the second section of the crank shaft while the first and second sections of the crank shaft are de-coupled; and synchronizing the first section of the crank shaft with the second section of the crank shaft to rotate the first and second sections of the crank shaft at a same rotation speed, while the first and second sections of the crank shaft are de-coupled and before engaging the coupling device and then engaging the coupling device at one or more predefined positions to couple the first and second sections of the crank shaft to be fixedly connected.

19. The method of claim 18 where engaging the coupling device occurs when a requested engine power output is greater than a predetermined threshold.

* * * * *